United States Patent
Berkovitch et al.

(10) Patent No.: US 9,819,569 B2
(45) Date of Patent: Nov. 14, 2017

(54) TRANSPORT SCRIPT GENERATION BASED ON A USER INTERFACE SCRIPT

(71) Applicant: Hewlett-Packard Development Company, L.P., Houston, TX (US)

(72) Inventors: Ido Berkovitch, Yehud (IL); Meidan Zemer, Yehud (IL); Gilat Naor, Yehud (IL)

(73) Assignee: EntIT Software LLC, Sunnyvale, CA (US)

(*) Notice: Subject to any disclaimer, the term of this patent is extended or adjusted under 35 U.S.C. 154(b) by 363 days.

(21) Appl. No.: 13/781,241

(22) Filed: Feb. 28, 2013

(65) Prior Publication Data
US 2014/0244831 A1    Aug. 28, 2014

(51) Int. Cl.
*G06F 15/173*    (2006.01)
*H04L 12/26*    (2006.01)
*G06F 11/36*    (2006.01)

(52) U.S. Cl.
CPC ............ *H04L 43/50* (2013.01); *G06F 11/368* (2013.01)

(58) Field of Classification Search
CPC .................................................. G06F 11/368
USPC .......................................................... 709/224
See application file for complete search history.

(56) References Cited

U.S. PATENT DOCUMENTS

| | | | |
|---|---|---|---|
| 8,234,393 B2 | 7/2012 | Schneider | |
| 2002/0147942 A1* | 10/2002 | Moe | G06F 11/3414 714/38.1 |
| 2008/0244062 A1 | 10/2008 | Elangovan et al. | |
| 2009/0288070 A1* | 11/2009 | Cohen et al. | 717/125 |
| 2009/0319567 A1* | 12/2009 | Frazer | G06F 11/3688 |
| 2010/0153087 A1* | 6/2010 | Kirtkow et al. | 703/21 |
| 2010/0153780 A1 | 6/2010 | Kirtkow et al. | |
| 2011/0088018 A1* | 4/2011 | Foley et al. | 717/131 |
| 2011/0145795 A1 | 6/2011 | Khanapurkar et al. | |
| 2012/0198476 A1 | 8/2012 | Markuza et al. | |

OTHER PUBLICATIONS

"AppPerfect Load Test Introduction", Introduction to Web Load Test, retrieved on Jan. 29, 2013 from <http://www.appperfect.com/support/docs/load-test/loadtest/introduction.html > (4 pages).

* cited by examiner

*Primary Examiner* — Kevin Mai (57) ABSTRACT

Transport script generation based on a user interface script is disclosed herein. An example apparatus comprises a processor and a memory comprising machine-readable instructions. When executed by the processor, the machine-readable instructions cause the processor to determine if a first timestamp associated with a server is more recent than a second timestamp associated with a first transport script, the first timestamp representing a time when the server was last updated, the second timestamp representing a time when the transport script was generated. The processor is further to automatically generate a second transport script when the first timestamp is more recent than the second timestamp, the generation comprising: recording network requests while executing a user interface script, and modifying the second transport script based on the recorded network requests. The processor is further to test the server by executing the second transport script.

20 Claims, 8 Drawing Sheets

| LINE | UI SCRIPT COMMAND |
|---|---|
| 410 | Navigate to "www.websiteToBeTested.com" |
| 420 | Type "test" into textbox of form "formname" |
| 430 | Submit form "formname" |

FIG. 4

| LINE | TRANSPORT SCRIPT COMMAND |
|---|---|
| 502 | // Navigate to "www.websiteToBeTested.com" |
| 504 | Web_url("www.websiteToBeTested.com", |
| 506 | "URL="http://www.websiteToBeTested.com/", |
| 508 | EXTRARES, |
| 510 | "URL=http://www.websiteToBeTested.com/favicon.ico", "Referer=", |
| 512 | "RequestOrigin=browser", ENDITEM, |
| 514 | LAST); |
| 516 | //screenshot = image01.png |
| 518 | Web_submit_form(formname, |
| 520 | ITEMDATA, |
| 522 | "Name=q", "value=$param1", "defaultvalue=test",ENDITEM); |

FIG. 5

| LINE | TRANSPORT SCRIPT COMMAND |
|---|---|
| 602 | // Navigate to "www.websiteToBeTested.com" |
| 604 | Web_url("www.websiteToBeTested.com", |
| 606 | "URL="http://www.websiteToBeTested.com/", |
| 608 | EXTRARES, |
| 610 | "URL=http://www.websiteToBeTested.com/favicon.ico", "Referer=", |
| 612 | "RequestOrigin=browser", ENDITEM, |
| 614 | LAST); |
| 616 | //screenshot = image01.png |
| 618 | Web_submit_form(formname, |
| 620 | ITEMDATA, |
| 622 | "Name=query", "value=$param1", "defaultvalue=test",ENDITEM); |

TRANSPORT SCRIPT GENERATION BASED ON A USER INTERFACE SCRIPT

BACKGROUND

Servers provide information to requesting clients via networks such as the Internet. Such servers are frequently upgraded to provide additional features, usability, etc. to users. Users expect that a server will perform at or above levels of previous performance after such upgrades. To identify whether a server has degraded in performance after an upgrade, performance tests are executed to measure a performance level of the server. Such performance tests simulate a load on the server to determine a performance value and/or to ensure that the server does not fail under a load. The load may represent a number of users performing various tasks, operations on the server, etc.

DETAILED DESCRIPTION

A load test is a test that is directed to a server to determine if the server meets or exceeds a given performance criteria. The server may be, for example, a server that responds to requests for, for example, a webpage (e.g., a web server). Servers typically support large numbers (e.g., ten thousand or more) users simultaneously. Accordingly, when a change is made to the server, testing the server after the change with requests from a single user is usually not adequate. The load test simulates multiple users to more adequately simulate real world conditions. Thus, server issues can be identified during the development process, rather than having such issues discovered once the server is live (e.g., under an actual load).

Automated load testing is an important aspect of server and/or application development. Load testing systems execute scripts and/or test plans to test the performance of servers and/or applications throughout the development process. For example, as a new feature is developed, a performance test may be automatically performed to ensure that there has been no degradation in performance. Two types of performance testing are: (1) user interface (UI) tests and (2) transport and/or network level tests.

A user interface (UI) test is a test that simulates user interaction with an application communicating with the server. Simulated user interaction may include, for example, mouse clicks, mouse movements, keystrokes, delays, etc. A UI test is performed by execution of a UI script. The UI script includes a series of actions that simulate interaction with a user interface provided by the server (e.g., interaction with a user interface of a website). When an underlying structure of a web application is changed, the user interface does not necessarily change. For example, a change to a search may not impact how a search interface is displayed. Tests performed by UI scripts are resilient to such changes because the tests are not dependent on the underlying functionality of the server.

UI scripts, while resilient to underlying implementation changes to a server, have poor performance. For example, to implement a UI script, the testing system must simulate user interaction with the interface. Such interaction may include mouse movements, mouse clicks, keystrokes, delays, etc. Simulating such interaction is resource intensive and is difficult to extrapolate to more than a few simulated sessions (e.g., simulated users) at a time.

Transport scripts simulate network interactions with the server. Transport and/or network tests are performed by execution of a transport script. Transport scripts, unlike UI scripts, are easily extrapolated to simulate many users (e.g., ten thousand or more users). For example, in normal operation when a user is interacting with a server, the user may input a search parameter and execute a search query. The search query may trigger the transmission of a request (e.g., a HyperText Transfer Protocol (HTTP) request) to the server. To simulate many users, the testing system may transmit a selected number of requests to the server. A response to each request may be verified to ensure that the server is functioning properly under the test load.

Simulating a large number of requests by a transport script is less resource intensive than simulating a large number of user interactions with a UI script. However, transport scripts are not resilient to changes in the underlying functionality of a server. For example, if a name of a parameter included in a request is modified during development, executing a transport script may give improper results. Because application testing is part of the development process, servers are frequently tested during development to ensure that there is no regression (e.g., broken features, degradation of usability, lower performance, etc.). However, maintaining transport scripts so that they correspond to changes in the server during the development cycle of the server is time consuming and is sometimes overlooked by application developers. Because maintaining transport scripts is difficult, developers may choose to load test the server infrequently during the development cycle (e.g., as a major build of the server is finished, as a final version of a web application is completed, etc.). Infrequent load testing reduces the ability of a developer to identify changes that cause reduced performance. However, transport scripts are susceptible to problems such as, for example, misconfiguration of the transport script due to an update to the server, a failure of the server to respond to a network request. When a problem is identified during testing, an engineer investigates the transport script to identify whether the problem was caused by a misconfiguration of the transport script.

Example methods, apparatus, and articles of manufacture disclosed herein enable generation of transport scripts that adapt to changes in a server. In examples disclosed herein, transport scripts are generated based on UI scripts by executing the UI script while recording network requests to create the transport script. The transport script may be updated, for example, once a new build of a server is detected, nightly, upon detection of an execution error in a previous transport script, etc. Because the transport script is automatically updated, accurate load tests can be performed more frequently, enabling developers to identify performance problems in early stages of development. Accordingly, transport script generation does not require user intervention, and the transport script can be maintained throughout the development process. Further, because the transport script is automatically maintained, the time that developers must spend creating test scripts is reduced.

Figure 1:
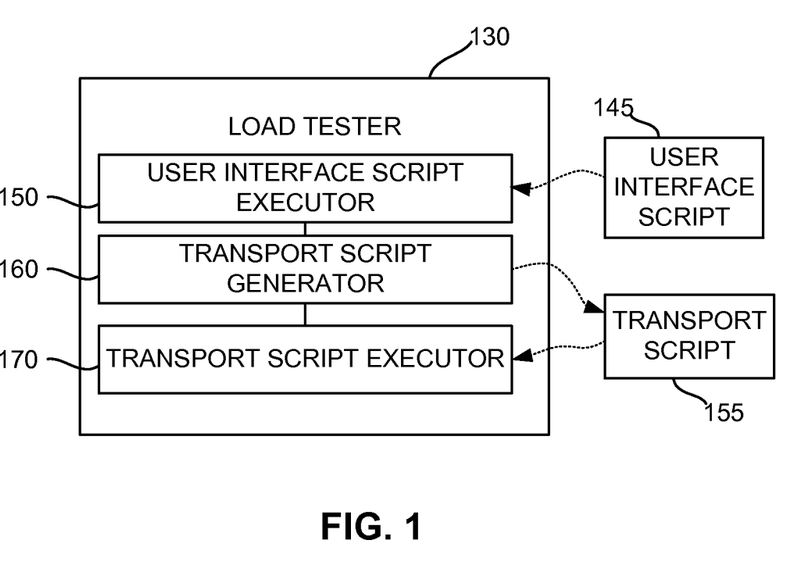
FIG. 1 illustrates an example load tester constructed in accordance with the teachings of this disclosure to generate a transport script.

FIG. 1 illustrates an example load tester 130 constructed in accordance with the teachings of this disclosure to generate a transport script. The example load tester 130 of the illustrated example of FIG. 1 includes a user interface script executor 150, a transport script generator 160, and a transport script executor 170. The example user interface script executor 150 executes a user interface script 145. At the same time, the transport script generator 160 generates a transport script 155. In the illustrated example, the transport script generator 160 generates the transport script 155 by monitoring network communications of the load tester 130 directed towards a server. To perform a load test, the transport script executor 170 executes the transport script 155 generated by the transport script generator 160.

Figure 2:
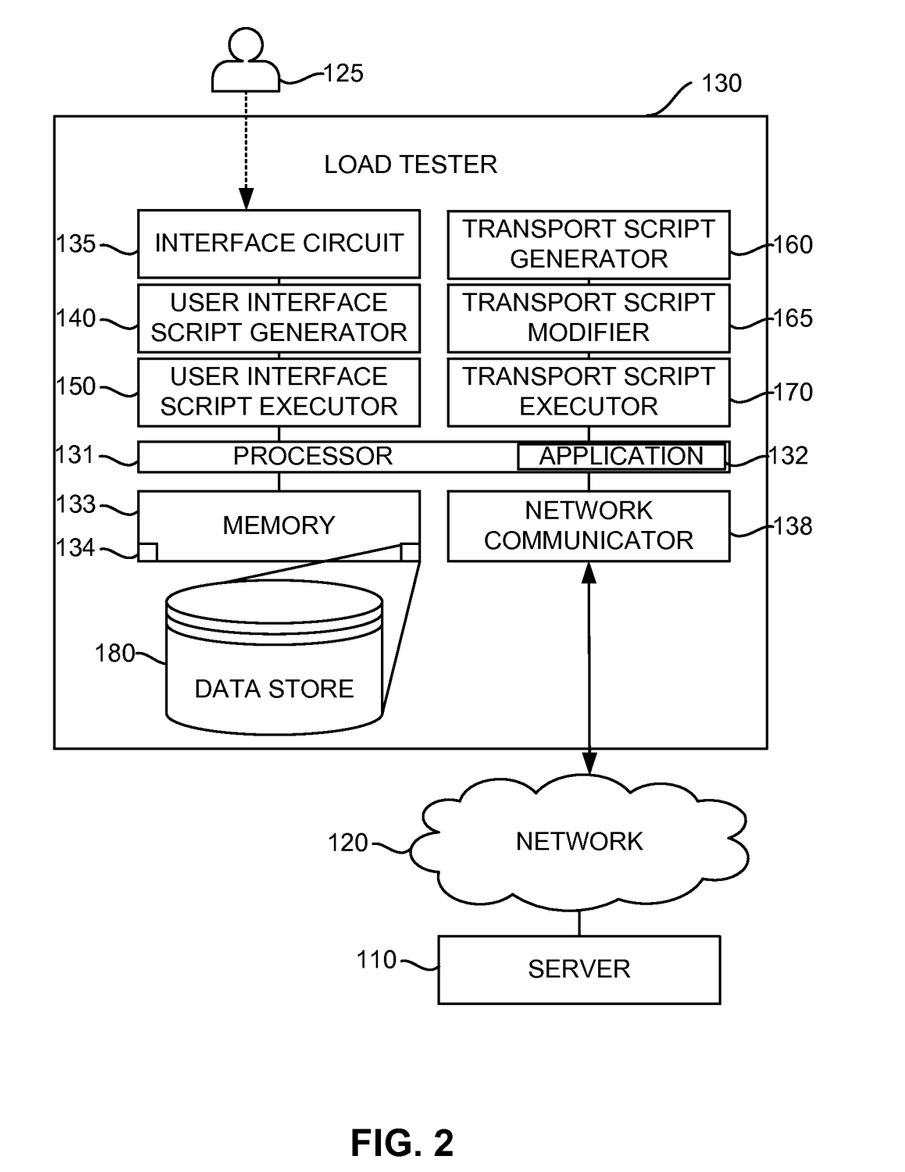
FIG. 2 illustrates an example system constructed in accordance with the teachings of this disclosure and including the load tester of FIG. 1.

FIG. 2 illustrates an example system for load testing including the load tester 130 of FIG. 1, a network 120 and a server 110. The example server 110 of FIG. 2 is implemented by a processor executing instructions, but could be additionally or alternatively implemented by an application specific integrated circuit(s) (ASIC(s)), programmable logic device(s) (PLD(s)) and/or field programmable logic device(s) (FPLD(s)), and/or other analog and/or digital circuitry. In the illustrated example, the server 110 is a web server that hosts Internet content (e.g., webpages, images, video, etc.). The server 110 of the illustrated example responds to requests for Internet content received via hypertext transfer protocol (HTTP). However, any other past, present, and/or future protocols and/or types of requests may additionally or alternatively be used. Further, any other type of server 110 may additionally or alternatively be used. For example, the server 110 may be a database server that responds to data queries such as, for example, structured query language (SQL) queries. In examples disclosed herein, the server 110 is a physical hardware server. However, in some examples, the server 110 is implemented as a software program (e.g., a server daemon).

The example network 120 of the illustrated example of FIG. 2 is a local network. However, any other network could additionally or alternatively be used. For example, some or all of the network 120 may be a company's intranet network, a personal (e.g., home) network, the Internet, etc. Although the network 120 of the illustrated example operates based on the HTTP and IP protocols, the network 120 may additionally or alternatively use any other protocol to enable communication between devices on the network. In the illustrated example, the network 120 is a physical network. However, in some examples, the network may be a virtual network such as, for example, a virtual private network (VPN), etc.

The example load tester 130 of the illustrated example includes a processor 131, a memory 133, an interface circuit 135, a network communicator 138, a user interface script generator 140, the user interface script executor 150, the transport script generator 160, a transport script modifier 165, and the transport script executor 170.

The example processor 131 of the illustrated example of FIG. 2 is a silicon-based processor. The processor 131 can be implemented by one or more microprocessors or controllers from any desired processor family or manufacturer. The processor 131 includes a local memory (e.g., a cache) and is in communication with the example memory 133 via a bus.

In the illustrated example, the example processor 131 executes an application 132 that communicates with the server 110. The example application 132 is a browser (e.g., Microsoft Internet Explorer®, Mozilla Firefox®, Apple Safari®, Google Chrome™, etc.). However, any other application that communicates with the server 110 may additionally or alternatively be used. For example, the application 132 may be a database application.

The example memory 133 of the illustrated example of FIG. 2 is implemented by Synchronous Dynamic Random Access Memory (SDRAM). However, any other past, present, and/or future memory technology may additionally or alternatively be used such as, for example, Dynamic Random Access Memory (DRAM), RAMBUS Dynamic Random Access Memory (RDRAM), flash memory, etc. In some examples, the memory 133 is implemented by one or more mass storage devices for storing software and data. Examples of such mass storage devices include floppy disk drives, hard drive disks, compact disk drives, and digital versatile disk (DVD) drives. The memory 133 may implement the data store 180. In the illustrated example, the memory 133 stores coded instructions 134. The coded instructions 134 are representative of instructions to perform the processes of FIGS. 7, 8, 9, and/or 10. The coded instructions 134 may be stored in the memory 133, on a removable storage medium such as a CD or DVD, and/or any other physical memory device.

In the illustrated example, the load tester 130 includes the example interface circuit 135. The example interface circuit 135 may be implemented by any type of interface standard, such as an Ethernet interface, a universal serial bus (USB), and/or a PCI express interface. In the illustrated example, one or more input devices are connected to the interface circuit 135. The input device(s) permit a user 125 to enter data and/or commands into the load tester 130. The input device(s) can be implemented by, for example, a keyboard, a mouse, a touchscreen, a track-pad, a trackball, isopoint and/or a voice recognition system.

The example load tester 130 also includes a network communicator 138 such as a modem or network interface card to facilitate exchange of data with external computers via the network 120 (e.g., an Ethernet connection, a digital subscriber line (DSL), a telephone line, coaxial cable, a cellular telephone system, etc.). In some examples the network communicator 138 communicates with the network 120 using one or more wireless technologies (e.g., WiFi, Bluetooth, etc.).

The example user interface script generator 140 of the illustrated example of FIG. 2 is implemented by a processor executing instructions, but it could additionally or alternatively be implemented by an ASIC(s), PLD(s), FPLD(s), and/or other analog and/or digital circuitry. In the illustrated example, the user interface script generator 140 receives user input from the interface circuit 135 and generates the UI script 145 of FIG. 1. The example user interface script generator 140 monitors user interface events such as, for example, key presses, mouse movements, mouse clicks, window activations, etc. The example user interface script generator 140 creates a UI script (e.g., a recording) of the user interface events so that they may be played back to simulate user interaction with the application 132. In the illustrated example, the user interface script generator 140 records interaction of a user 125 via the interface circuit 135 while the user 125 is performing an action to be replicated for load testing purposes. That is, the interactions of the user are designed to perform a particular test against the server 110. However, in some examples, the user interface script generator 140 records user interaction when the user is not performing a particular test against the server 110. Thus, for example, the user interaction recorded by the example user interface script generator 140 might represent a wide range of user activities in association with the server 110.

Figure 4:
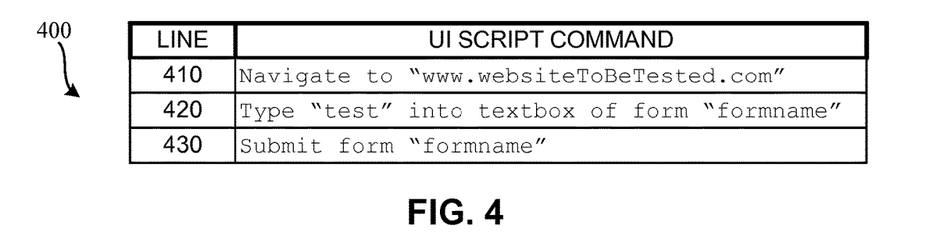
FIG. 4 illustrates an example user interface script that may be used to regenerate a transport script.

In the illustrated example, the user interface script 145 is generated by the user interface script generator 140. However, in some examples, the user interface script 145 is generated in a different fashion. For example, the example user interface script 145 may be written by a user. The user interface script 145 is a set of instructions that causes the load tester 130 to perform a test of the server 110. An example user interface script is shown in FIG. 4. In the illustrated example, the user interface script 145 is stored in the memory 133. However, the user interface script 145 may be stored in any other location. In the illustrated example, the user interface script 145 is a text file that is interpreted by the user interface script executor 150 to implement the test. However, any other type and/or format may additionally or alternatively be used. For example, the user interface script 145 may be an executable file.

The example user interface script executor 150 of the illustrated example of FIG. 2 is implemented by a processor executing instructions, but it could additionally or alternatively be implemented by an ASIC(s), PLD(s), FPLD(s), and/or other analog and/or digital circuitry. In the illustrated example, the user interface script executor 150 executes the user interface script 145 to simulate user interaction. The simulated user interaction of the example user interface script executor 150 is user interface level interaction. For example, mouse movements, mouse clicks, key presses, etc. are implemented by the user interface script executor 150 to simulate user interaction with the application 132 communicating with the server 110. Because of the simulated interaction with the user interface, the application 132 communicates with the server 110 (e.g., a mouse click may cause a request to be sent to the server 110).

The example transport script generator 160 of the illustrated example of FIG. 2 is implemented by a processor executing instructions, but it could additionally or alternatively be implemented by an ASIC(s), PLD(s), FPLD(s), and/or other analog and/or digital circuitry. While the user interface script executor 150 is simulating user activity, the transport script generator 160 records network communications between the application 132 and the server 110. In the illustrated example, the network communications include HTTP requests, SQL queries, etc. However, any other past, present, and/or future type of network communications may additionally or alternatively be recorded.

In the illustrated example, the transport script generator 160 generates the transport script 155. The transport script 155 is a set of instructions that cause network requests to be transmitted from the application 132 to the server 110. When those network requests are later re-played by execution of the transport script 155, they simulate network communications caused by user interaction. In the illustrated example, the transport script 155 is stored in the memory 133. However, the transport script 155 may be stored in any other location. In the illustrated example, the transport script 155 is a text file that is interpreted by the user interface script executor 150 to implement the test. However, any other type and/or format may additionally or alternatively be used such as, for example, an extensible markup language (XML) file, a JavaScript file, etc.

The example transport script modifier 165 of the illustrated example of FIG. 2 is implemented by a processor executing instructions, but it could additionally or alternatively be implemented by an ASIC(s), PLD(s), FPLD(s), and/or other analog and/or digital circuitry. Changes made to the server 110 typically do not affect the user interface script 145. However, those changes are likely to affect the transport script. The example transport script modifier 165 modifies the transport script 155 based on information from the user interface script 145. For example, the user interface script 145 may indicate that the user waited for a period of time prior to clicking on an item. Such a delay is useful with respect to the transport script 155 because it enables the transport script 155 to accurately model network communications caused by a user. To account for such a delay, the example transport script modifier 165 modifies the transport script 155 by adding the delay. In some examples, the transport script 155 generated for a previous version of the server 110 may have been modified by an engineer to, for example, add a comment about a test to which the transport script 155 is related. In some examples, the example transport script modifier 165 carries user-made changes forward.

The example transport script executor 170 of the illustrated example of FIG. 2 is implemented by a processor executing instructions, but it could additionally or alternatively be implemented by an ASIC(s), PLD(s), FPLD(s), and/or other analog and/or digital circuitry. The example transport script executor 170 executes the transport script 155 based on an instruction from a user. However, in some examples, the example transport executor 170 executes the transport script 155 in response to detecting a modification (e.g., an update) to the server. In the illustrated example, the transport script 155 is used to simulate activity of a single user. Accordingly, to simulate multiple users, the transport script executor 170 may simultaneously and/or semi-simultaneously execute multiple instances of the transport script 155. For example, to simulate ten thousand users, the transport script 155 may be executed ten thousand times. Further, execution of the transport script 155 may be implemented in any other fashion. For example, the transport script 155 may be consecutively executed (e.g., a second execution of the transport script does not begin until a first execution has completed).

During execution of the transport script 155, the example transport script executor 170 monitors replies to the network requests for failures. A failure may be caused by any number of root causes. For example, the failure might have been caused by a failure of the server 110 (e.g., an error caused by the change made to the server). For example, the failure might have been caused by a misconfiguration between the transport script 155 and the server 110. If, for example, the server 110 was updated, the transport script 155 may no longer be properly formatted for use with the server 110. For example, if a name of a parameter was modified on the server, that parameter name change might not have been replicated to the transport script 155. Accordingly, when a failure is detected, the transport script executor 170 of the illustrated example compares a timestamp of the transport script 155 with a timestamp of the server 110 to determine if the transport script 155 is out of date. If the transport script 155 is out of date, the transport script 155 is automatically regenerated by executing the UI script 145 and monitoring network requests. Automatic regeneration of the transport script 155 ensures that failures encountered during load testing do not originate from the transport script 155.

Figure 3:
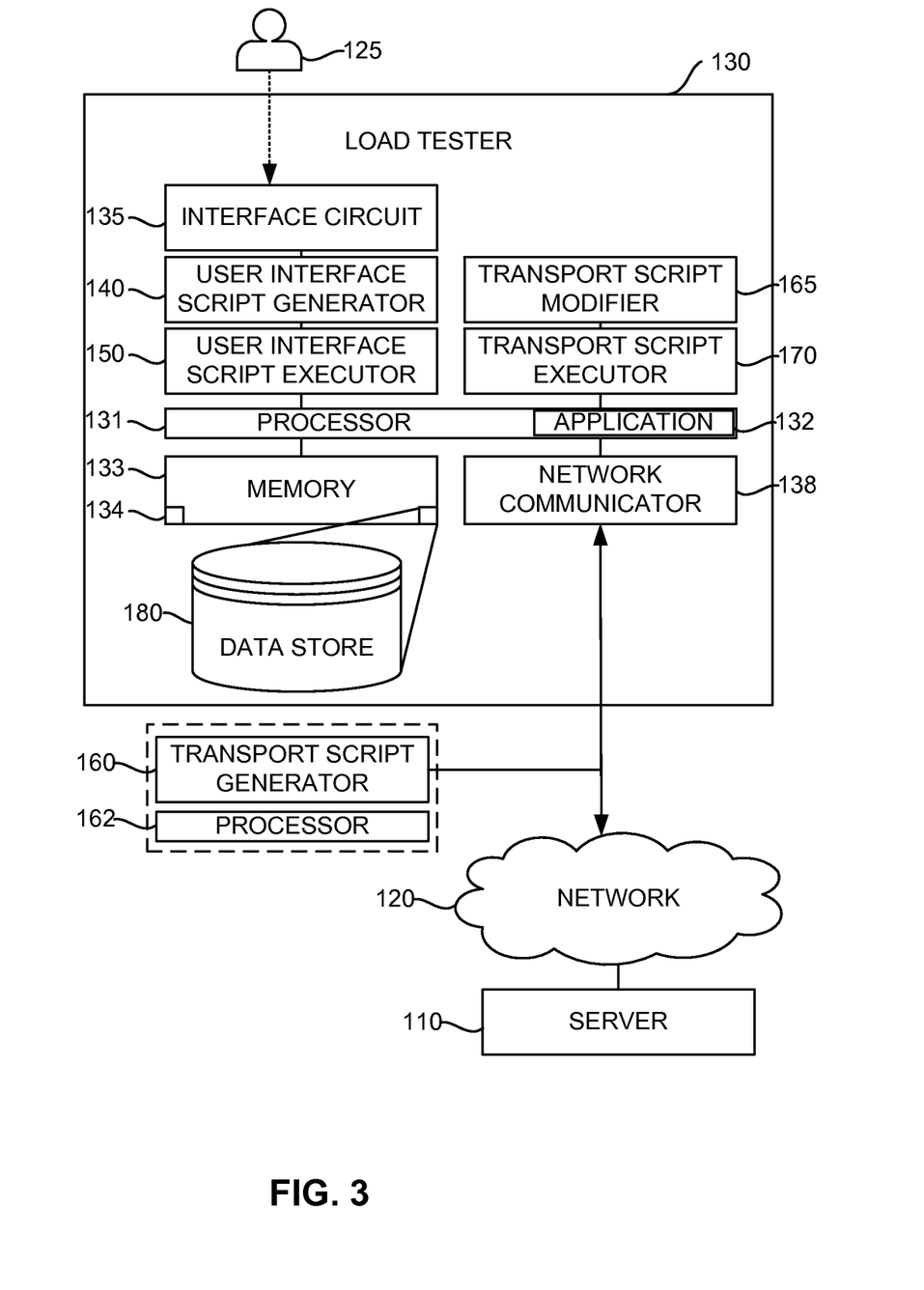
FIG. 3 illustrates another example system constructed in accordance with the teachings of this disclosure including the load tester of FIG. 1.

FIG. 3 illustrates another implementation of the example system 200 of FIG. 2. In the example system 300 of FIG. 3 the transport script generator 160 is located apart from the load tester 130. In the illustrated example of FIG. 3, the example transport script modifier 165 is implemented by a processor executing instructions, but it could additionally or alternatively be implemented by an ASIC(s), PLD(s), FPLD (s), and/or other analog and/or digital circuitry. Rather than locally monitoring network communications between the application 132 and the server 110 (as shown in FIG. 2), the transport script generator 160 of FIG. 3 remotely monitors network communications between the application 132 and the server 110. Accordingly, the example transport script generator 160 of FIG. 3 may be used in combination with a processor 162. The example processor 162 of the illustrated example of FIG. 3 is a silicon-based processor. The processor 132 can be implemented by one or more microprocessors or controllers from any desired processor family or manufacturer.

FIG. 4 illustrates an example user interface script 400 representing an example test case. While the user interface script 400 of the illustrated example represents one test case, many other test cases having any other purpose, configuration, etc. may additionally or alternatively be used. The example user interface script 400 of FIG. 4 is represented as a text file, with each line representing an instruction to be performed to simulate user interaction with the application 132. In the illustrated example of FIG. 4, the user interface script 400 represents the example test case in which a user navigates to a website (e.g., www.websiteToBeTested.com at line 410) associated with (e.g., served by) the server 110 and enters a search term. The example user interface script 400 of FIG. 4 is formatted as a script for use with Hewlett Packard's Load Runner testing platform. However, the user interface script 400 may be formatted for use with any other system and/or testing platform.

The user interface script 400, when executed by the example user interface script executor 150, causes the example user interface script executor 150 to instruct the application 132 to navigate to the website to be tested. (line 410). In the illustrated example of FIG. 4, navigation is implemented by entering a universal resource locator of a website to be tested into a navigation bar of the application 132 and simulating a keystroke of an enter button. However, navigation may be implemented in any other fashion. Once the navigation operation of line 410 is complete, the example user interface script executor 150 simulates keystrokes to enter a search term (e.g., "test") into a textbox of a form on the website. (line 420). In the illustrated example, inputting is implemented by selecting the textbox (e.g., by moving a mouse cursor to a position of the text box and clicking) and simulating user input (e.g., keystrokes) via the interface circuit 135 to enter the search term. While, in the illustrated example, a search term is entered into a textbox, any other type of form operation or other input may additionally or alternatively be performed. For example, a checkbox may be checked, a list box may have an item selected, a scrollbar may be operated, etc.

The user interface script 400, when interpreted by the example user interface script executor 150, causes the example user interface script executor 150 to submit the form to the website. (line 430). In the illustrated example of FIG. 4, form submission is implemented by simulating a mouse movement to move the mouse cursor to a position of a submit button associated with the form and simulating a mouse click on the button. However, form submission may be implemented in any other fashion. For example, the user interface script executor 150 may simulate, via the interface circuit 135, an enter key stroke while an element of the form (e.g., a textbox, etc.) is selected. In the illustrated example, submitting the form (e.g., simulating a mouse click or keystroke to cause the form to be submitted) causes a new webpage to be displayed (e.g., a search results webpage, etc.).

Any other actions may additionally or alternatively be performed based on the UI script 400. For example, the UI script 400, when interpreted by the example user interface script executor 150, may cause the user interface script executor 150 to pause (e.g., sleep, delay, wait, etc.) for a period of time before simulating entry of the search term. Further, the example user interface script executor 150 may simulate any other action such as, for example clicking on a link, moving the mouse cursor (e.g., to trigger a mouseover event), simulate a backwards navigation (e.g., by clicking a "back" button, by pressing a backspace key), etc.

Figure 5:
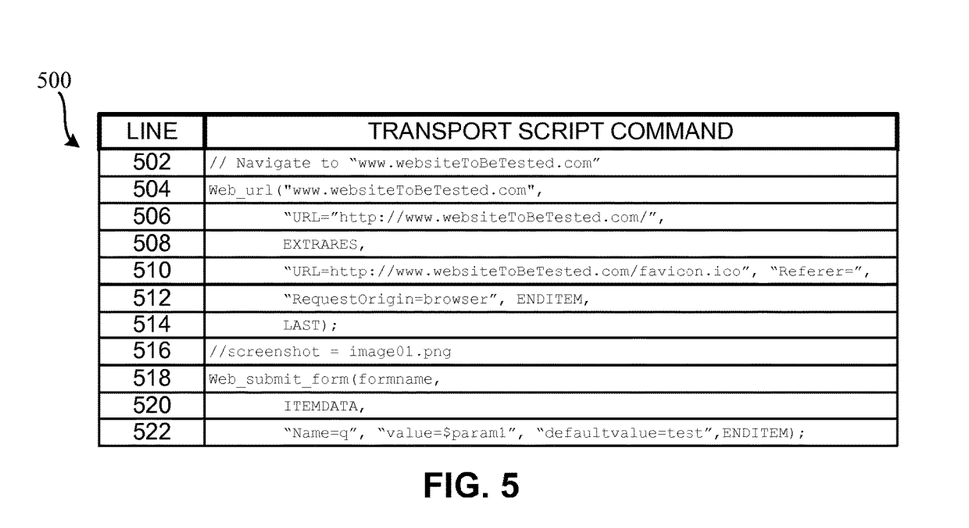
FIGS. 5 and 6 illustrate example transport scripts that may be used to perform load testing on the example server of FIG. 1.
Figure 6:
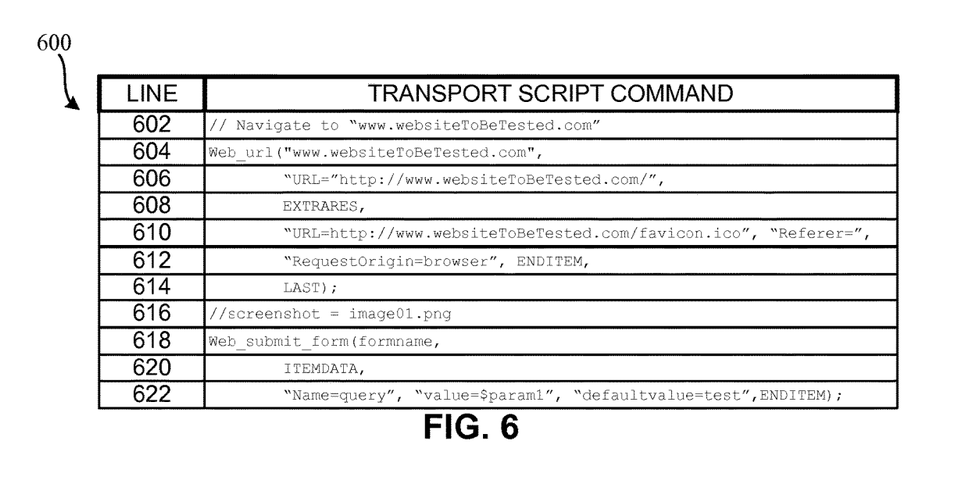

FIGS. 5 and 6 illustrate example transport scripts 500, 600 that may be used to perform load testing on the example server 110 of FIGS. 2 and/or 3. In the illustrated example, a parameter name for the textbox associated with line 420 of the UI script 400 of FIG. 4 was changed from "q" in FIG. 5 to "query" in FIG. 6 (e.g., due to a server update). Because execution of the transport script 500 of FIG. 5 is affected by such a change (while the UI script 400 of FIG. 4 is not affected by the change), the transport script should be regenerated (e.g., to generate the transport script 600) to avoid errors. In the illustrated example, the transport scripts 500, 600 are formatted as JavaScript files. However, any other type and/or format of file may additionally or alternatively be used such as, for example, an extensible markup language (XML) file. Furthermore, any other parameters for forming the transport scripts 500, 600 may additionally or alternatively be included such as, for example, comments, tags, schemas, etc. Like the UI script 400, the transport scripts 500, 600 are executed in order. That is, a first line and/or tag (e.g., a multiline tag as shown in lines 504, 506, 508, 510, 512, and 514) is executed before a second line and/or tag.

The example transport script 500 of FIG. 5 represents network requests resulting from execution of the user interface script 400. The multiline instruction represented by lines 504, 506, 508, 510, 512, and 514 causes the example transport script executor 170 to transmit a request to a target website to be tested. (lines 504, 506, 508, 510, 512, and 514). In some examples, a result of the request is validated to ensure that there are no failures. For example, the result may be validated to ensure that an HTTP status code of 200 is returned indicating that the request was successful. However, any other way of validating a result may additionally or alternatively be used such as, for example, validating that a particular text was returned, validating that a response was received in a particular amount of time, etc.

The example transport script 500 causes the example transport script executor 170 to transmit a request to a search location of the server 110. (lines 518, 520, and 522). In the illustrated example of FIG. 5, the search request uses the parameter "q" to identify the search term. (line 522). In the illustrated example, the default search term is "test". However, any other default search term may additionally or alternatively be used. In the illustrated example, the search term is parameterized such that the transport script 500 may be executed multiple times using different search terms for each execution.

The example transport script 600 of FIG. 6 is similar to the example transport script 500 of FIG. 5. For example, lines 602 through 620 correspond respectively to lines 502 through 520 of FIG. 5. That is, lines 602 through 620 cause the example transport script executor 170 to perform the same actions as described in connection with lines 602 through 520 of FIG. 5. However, line 622 indicates a change in the server 110 in that the name of the query parameter was changed from "q" to "query". While this change would not affect the UI script 400 it would, at a minimum, cause an improper test to be performed against the server if the transport script 500 were not updated (e.g., the script might fail due to a mismatched parameter name or the parameter might not be received by the server). Accordingly, the transport script 600 of FIG. 6 has been changed by the transport script modifier 165 to reflect the change to the parameter name (e.g., the parameter name "q" is replaced by the parameter name "query"). Line 622 causes the example transport script executor 170 to transmit a request to a search location of the server 110. (line 622).

While an example manner of implementing the load tester 130 has been illustrated in FIGS. 1, 2, and/or 3, one or more of the elements, processes and/or devices illustrated in FIGS. 1, 2, and/or 3 may be combined, divided, re-arranged, omitted, eliminated and/or implemented in any other way. Further, the example interface circuit 135, the example user interface script generator 140, the example user interface script executor 150, the example transport script generator 160, the example transport script modifier 165, the example transport script executor 170, the example network communicator 138, and/or, more generally, the example load tester 130 of FIGS. 1, 2, and/or 3 may be implemented by hardware, software, firmware and/or any combination of hardware, software and/or firmware. Thus, for example, any of the example interface circuit 135, the example user interface script generator 140, the example user interface script executor 150, the example transport script generator 160, the example transport script modifier 165, the example transport script executor 170, the example network communicator 138, and/or, more generally, the example load tester 130 of FIGS. 1, 2, and/or 3 could be implemented by one or more circuit(s), programmable processor(s), application specific integrated circuit(s) (ASIC(s)), programmable logic device(s) (PLD(s)) and/or field programmable logic device(s) (FPLD(s)), etc. When reading any of the apparatus or system claims of this patent to cover a purely software and/or firmware implementation, at least one of the example interface circuit 135, the example user interface script generator 140, the example user interface script executor 150, the example transport script generator 160, the example transport script modifier 165, the example transport script executor 170, and/or the example network communicator 138 are hereby expressly defined to include a tangible computer-readable medium storage device or storage disc such as a memory, DVD, CD, Blu-ray, etc. storing the software and/or firmware. Further still, the example load tester 130 of FIGS. 1, 2, and/or 3 may include one or more elements, processes and/or devices in addition to, or instead of, those illustrated in FIGS. 1, 2, and/or 3, and/or may include more than one of any or all of the illustrated elements, processes and devices.

Figure 7:
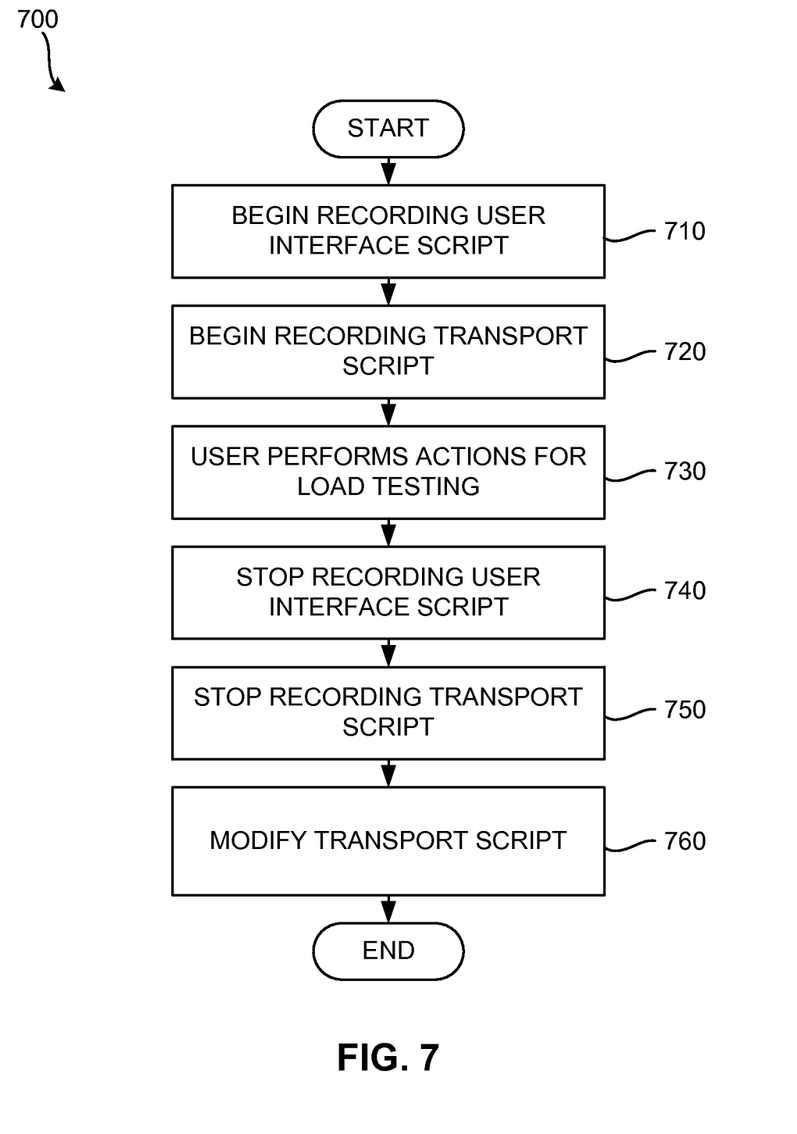
FIG. 7 is a flowchart representative of example machine-readable instructions that may be executed to implement the example load tester of FIG. 1 to generate a user interface script and a transport script.
Figure 8:
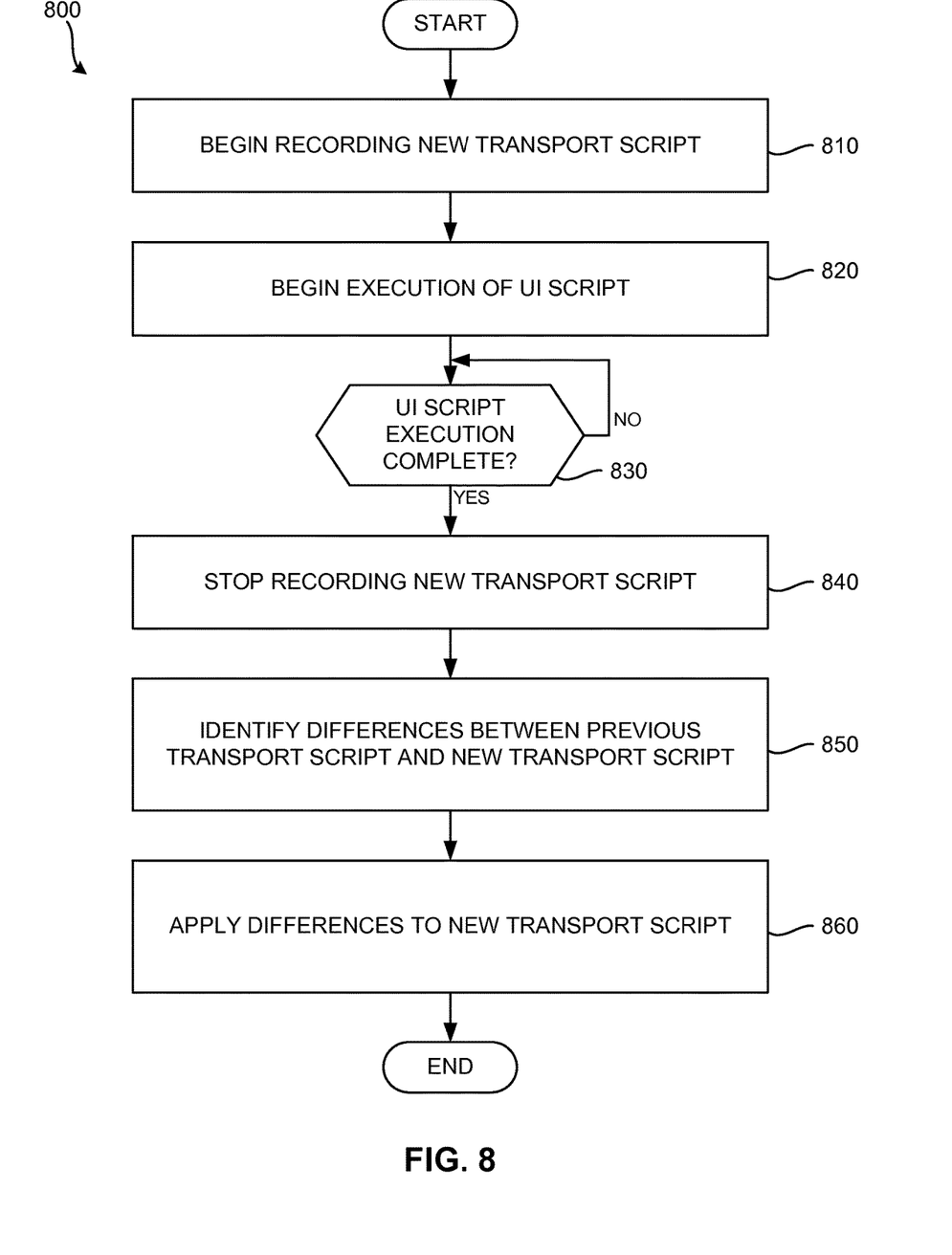
FIG. 8 is a flowchart representative of example machine-readable instructions that may be executed to implement the example load tester of FIG. 1 to automatically generate the transport script.
Figure 9:
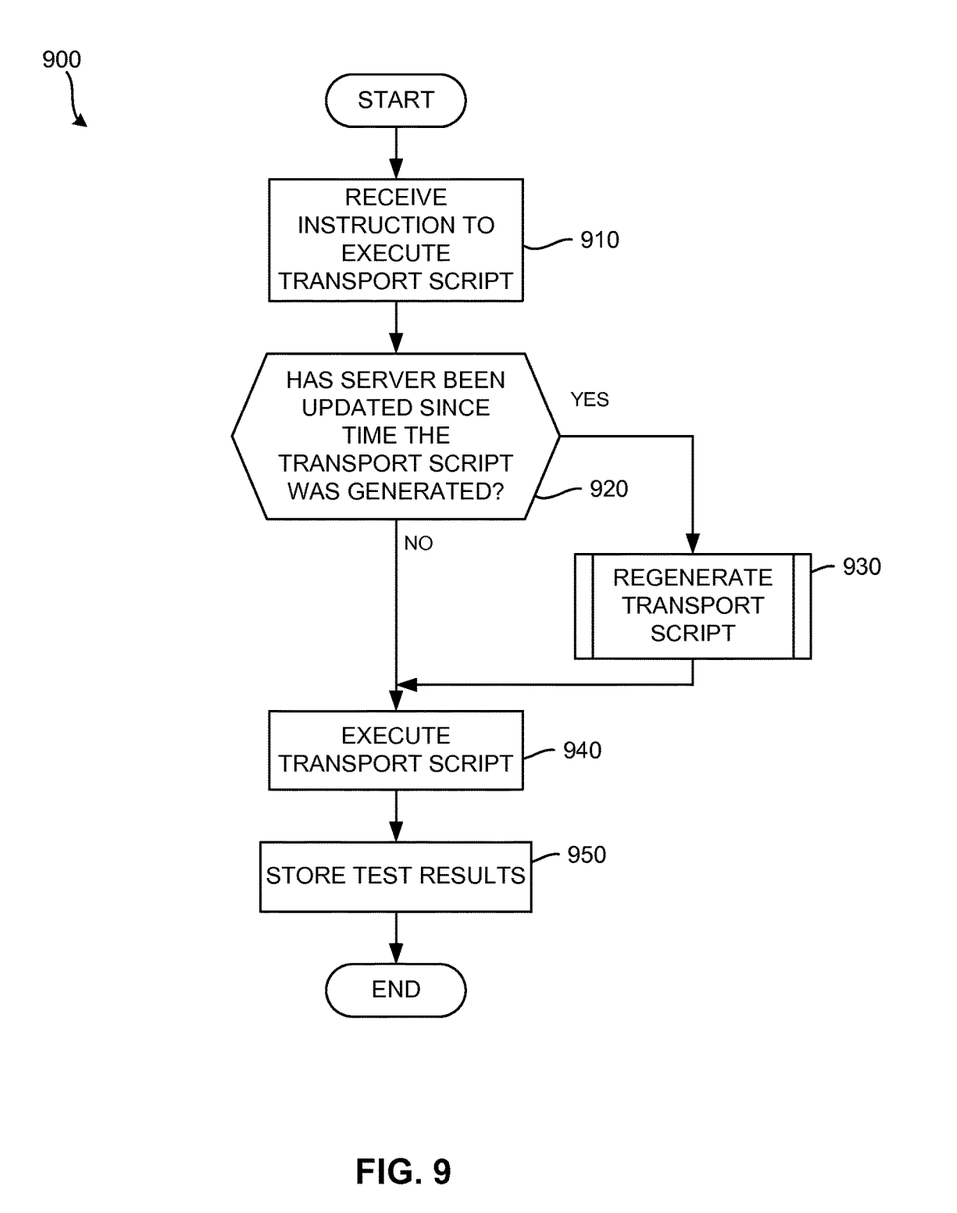
FIG. 9 is a flowchart representative of example machine-readable instructions that may be executed to implement the example load tester of FIG. 1 to automatically determine when to generate the transport script.

Flowcharts representative of example machine-readable instructions for implementing the load tester 130 of FIGS. 1, 2, and/or 3 are shown in FIGS. 7, 8, 9, and/or 10. In these examples, the machine-readable instructions comprise program(s) for execution by a processor such as the processor 131 shown in the example load tester 130 discussed in connection with FIGS. 2 and/or 3. The program(s) may be embodied in software stored on a tangible computer-readable medium such as a CD-ROM, a floppy disk, a hard drive, a digital versatile disk (DVD), a Blu-ray disk, or a memory associated with the processor 131, but the entire program(s) and/or parts thereof could alternatively be executed by a device other than the processor 131 and/or embodied in firmware or dedicated hardware. Further, although the example program(s) are described with reference to the flowcharts illustrated in FIGS. 7, 8, 9, and/or 10, many other methods of implementing the example load tester 130 may alternatively be used. For example, the order of execution of the blocks may be changed, and/or some of the blocks described may be changed, eliminated, or combined.

As mentioned above, the example processes of FIGS. 7, 8, 9, and/or 10 may be implemented using coded instructions (e.g., computer and/or machine readable instructions) stored on a tangible computer-readable storage medium such as a hard disk drive, a flash memory, a read-only memory (ROM), a compact disk (CD), a digital versatile disk (DVD), a cache, a random-access memory (RAM) and/or any other storage device or storage disc in which information is stored for any duration (e.g., for extended time periods, permanently, brief instances, for temporarily buffering, and/or for caching of the information). As used herein, the term tangible computer-readable storage medium is expressly defined to include any type of computer readable storage disc and/or storage device and to exclude propagating signals. As used herein, "tangible computer readable storage medium" and "tangible machine readable storage medium" are used interchangeably. Additionally or alternatively, the example processes of FIGS. 7, 8, 9, and/or 10 may be implemented using coded instructions (e.g., computer-readable instructions) stored on a non-transitory computer-readable medium such as a hard disk drive, a flash memory, a read-only memory, a compact disk, a digital versatile disk, a cache, a random-access memory and/or any other storage disc or storage device in which information is stored for any duration (e.g., for extended time periods, permanently, brief instances, for temporarily buffering, and/or for caching of the information). As used herein, the term non-transitory computer-readable medium is expressly defined to include any type of computer-readable disc or storage device and to exclude propagating signals. As used herein, when the phrase "at least" is used as the transition term in a preamble of a claim, it is open-ended in the same manner as the term "comprising" is open ended.

FIG. 7 is a flowchart 700 representative of example machine-readable instructions that may be executed to implement the example load tester 130 of FIGS. 1, 2, and/or 3 to generate a UI script and a transport script. In the illustrated example of FIG. 7, both the UI script and the transport script are generated based on user input. This is useful when, for example, a transport script has not previously been generated, a change has occurred that affects the operation of a previously recorded UI script, a new test plan is being created, etc. The example process 700 begins when the user interface script generator 140 begins recording a UI script. (block 710). At approximately the same time, the transport script generator 160 may begin recording network communications to generate a transport script. (block 720). The user 125 performs actions by controlling the load tester 130 via the interface circuit 135. (block 730). Upon completion of the actions by the user, the user interface script generator 160 stops recording the user input used to generate the UI script. (block 740). The UI script is saved in a memory of the load tester 130 and is later used to re-generate the transport script. The transport script generator 160 stops recording the network communications used to generate the transport script. (block 750). The transport script generator 160 saves the transport script based on the network communications. The transport script modifier 165 then integrates UI information found in the UI script into the transport script. (block 760). Such integrated information is useful for identifying what is being tested by the transport script. For example, a comment may be added to the transport script indicating that the user clicked on a search box. Using the UI script, it is possible to identify, for example, when a page has been loaded, which data was manually entered by the user, when the user interface event occurred (e.g., clicking on a button), etc.

FIG. 8 is a flowchart 800 representative of example machine-readable instructions that may be executed to implement the example load tester 130 of FIGS. 1, 2, and/or 3 to automatically generate the transport script. In the illustrated example of FIG. 8, the transport script is generated based on execution of the UI script. This is useful when, for example, a change has occurred that affects the operation of the transport script, etc. The example process 800 begins when the transport script generator 160 begins recording network communications to generate a new transport script. (block 810). The user interface script executor 150 begins execution of the UI script. (block 820). While the user interface script executor 150 is executing the UI script, the transport script generator 160 waits for the execution of the UI script to complete (block 830). If execution of the UI script is not complete, the transport script generator 160 continues to record network communications to generate the new transport script (block 830). If execution of the UI script is complete (block 830), the transport script generator 160 stop recording the new transport script, (block 840) and saves the recorded network communications as the new transport script. Using the newly created transport script, the transport script modifier identifies differences between the previous version of the transport script and the newly created transport script. (block 850). Differences may occur because of changes made to the server 110 that affected the network communications of the load tester 130. In some examples, differences may occur because of changes and/or modifications made to the previous version of the transport script by an engineer. An engineer may modify a transport script to, for example, alter validation parameters, add additional instructions, etc. The transport script modifier 165 differentiates changes to the transport script resulting from an update to the server from changes to the transport script resulting from a modification by an engineer by determining whether the change is included as part of a monitored network request. For example, comments that are added by the engineer are not part of the monitored network request. However, any other way of identifying engineer-made modifications may additionally or alternatively be used. After identifying these differences, the transport script modifier re-applies the engineer-made modifications to the previous version of the transport script to the new transport script. (block 860).

Figure 10:
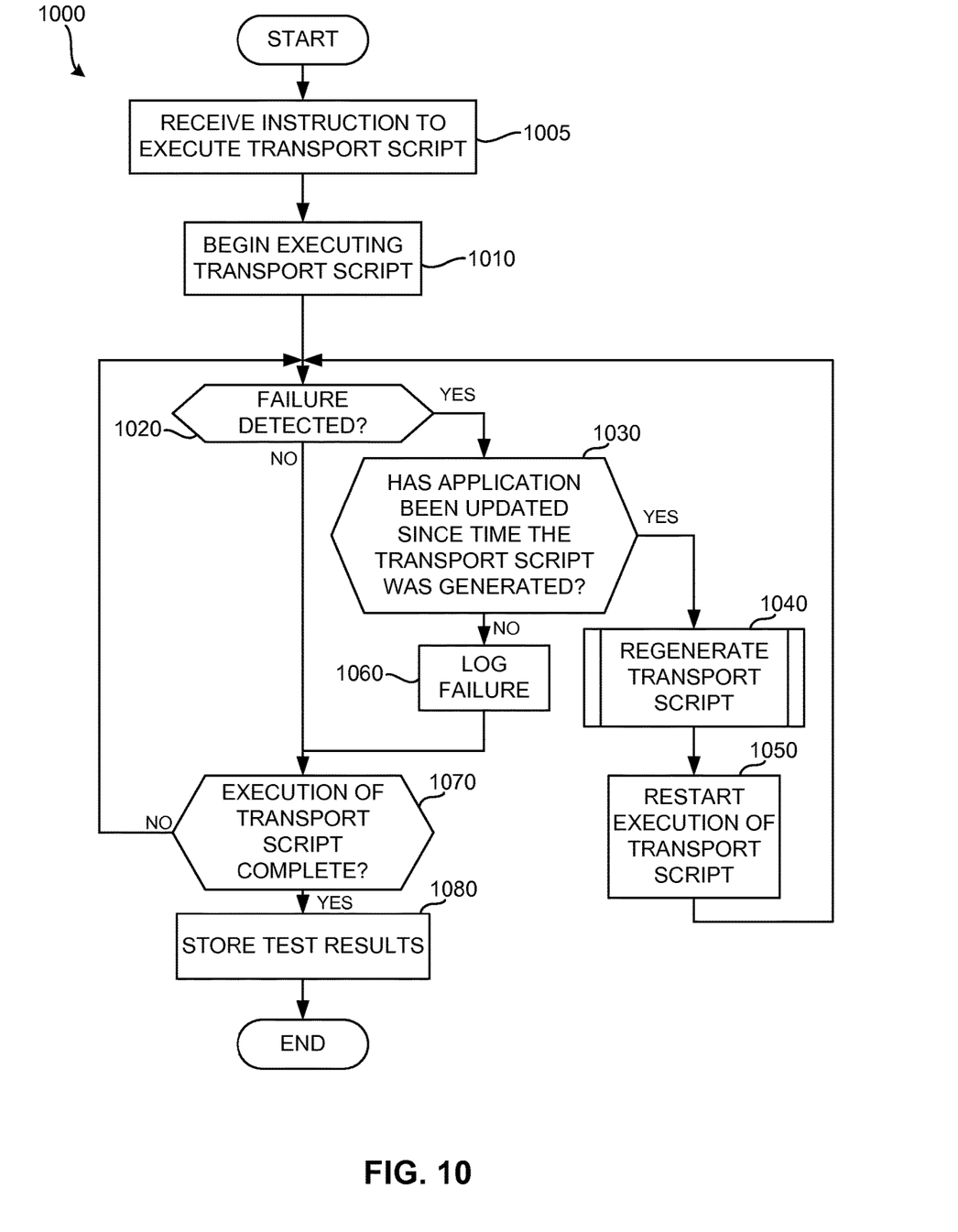
FIG. 10 is a flowchart representative of example machine-readable instructions that may be executed to implement the example load tester of FIG. 1 to automatically determine when to generate the transport script.

FIGS. 9 and 10 are flowcharts representative of example machine readable instructions that may be executed to implement the example load tester 130 of FIGS. 1, 2, and/or 3 to automatically determine when to regenerate the transport script. The transport script may be regenerated, for example, as a part of the server build process (e.g., when the server 110 is being compiled), periodically (e.g., every hour, nightly, every week, monthly, etc.), based on an instruction from a user, etc. FIG. 9 represents an example process 900 that may be used to identify whether to regenerate the transport script at the beginning of a load test. FIG. 10 represents an example process 1000 that may be used to identify whether to regenerate the transport script during a load test.

The example process 900 begins when the transport script executor 170 receives an instruction to execute the transport script. (block 910). The transport script executor 170 then identifies a first timestamp representing a time that the server 110 was most recently updated. In the illustrated example, the transport script executor 170 polls the server 110 to identify the first timestamp. However, any other way of identifying a time at which the server 110 was last updated may additionally or alternatively be used. The transport script executor 170 then identifies a second timestamp representing a time that the transport script was last generated. In the illustrated example, the transport script executor 170 identifies the second timestamp by inspecting a last modified date of the transport script (e.g., by inspecting file properties of the transport script). However, any other way of identifying a time when the transport script was last updated may additionally or alternatively be used. For example, the transport script executor may inspect a transport script generation log for a timestamp representing the last time the transport script was generated.

The transport script executor 170 then determines, based on the first and second timestamps, whether the server 110 has been updated since the time the transport script was last generated. (block 920). In some examples, the load tester 130 might not use timestamps to determine whether the transport script should be regenerated. For example, the load tester 130 may use version identifiers or any other identifier to determine whether to regenerate the transport script. When the transport script is regenerated, the transport script generator 160 sets a version identifier of the transport script equal to a version identifier of the server 110.

If the server 110 has been updated more recently than the transport script, the transport script executor 170 causes the transport script to be regenerated. (block 930). The load tester 130 regenerates the transport script according to the instructions of, for example, FIG. 8. If the transport script has been updated more recently than the server 110 and/or after the transport script has been regenerated, the transport script executor 170 executes the transport script. (block 940). The transport script executor 170 then stores load test results in the data store 180. (block 950).

The example process 1000 begins when the transport script executor 170 receives an instruction to execute the transport script. (block 1005). The transport script executor 170 then begins executing the transport script. (block 1010). While the transport script is being executed, the transport script executor 170 monitors the results of the execution to determine if a failure is detected. (block 1020). If a failure is detected, the failure may have been caused by a change to the server 110 that has not been replicated to the transport script. Alternatively, the failure may be a legitimate failure of the server 110. If the failure is detected, the transport script executor 170 identifies a first timestamp representing a time that the server 110 was most recently updated. In the illustrated example, the transport script executor 170 polls the server 110 to identify the first timestamp. However, any other way of identifying a time at which the server 110 was last updated may additionally or alternatively be used. The transport script executor 170 then identifies a second timestamp representing a time that the transport script was last generated. In the illustrated example, the transport script executor 170 identifies the second timestamp by inspecting a last modified date of the transport script (e.g., by inspecting file properties of the transport script). However, any other way of identifying a time when the transport script was last updated may additionally or alternatively be used. For example, the transport script executor may inspect a transport script generation log for a timestamp representing the last time the transport script was generated.

The transport script executor 170 then determines, based on the first and second timestamps, whether the server 110 has been updated since the time the transport script was last generated. (block 1030). If the server 110 has been updated more recently than the transport script, the transport script executor 170 causes the transport script to be regenerated. (block 1040). The load tester 130 regenerates the transport script according to the instructions of, for example, FIG. 8. The transport script executor 170 then restarts execution of the newly regenerated transport script. (block 1050). If the transport script is up to date, the failure is attributed to the server 110 and the transport script executor 170 logs the failure. (block 1060).

If no failure is detected (block 1020) or the failure is detected and logged (block 1060), the transport script executor 170 determines if execution of the transport script is complete. (block 1070). If execution is not complete, the transport script executor 170 continues to monitor for failures. (block 1020). If execution of the transport script is complete, the transport script executor 170 stores the load test results in the data store. (block 1080).

While FIGS. 9 and 10 illustrated example processes of determining when to regenerate the transport script, many other modifications and/or derivations of the examples of FIGS. 9 and/or 10 are possible. For example, with respect to FIG. 10, instead of comparing timestamps, the load tester 130 may regenerate the transport script upon occurrence of a first failure of the execution of the transport script. Upon the detection of subsequent failures, such failures may be logged. Furthermore, such failures may be attributed to the server 110 and/or to a UI script used to generate the transport script. In some examples, changes to the server 110 affect the UI script (e.g., the layout of the website to be tested is changed such that the UI script does not function properly). To address such a change, a user (e.g., a test engineer, an administrator, etc.) may be alerted to the subsequent failure so that they can decide whether the subsequent failure was related to a change that affected the UI script. The user may decide to alter and/or re-generate the UI script and/or transport script to correct the problem before continuing with the load testing.

Although certain example methods, apparatus, and articles of manufacture have been described herein, the scope of coverage of this patent is not limited thereto. On the contrary, this patent covers all methods, apparatus, and articles of manufacture fairly falling within the scope of the claims of this patent.

What is claimed is:
1. An apparatus comprising:
   a processor;
   a memory comprising machine-readable instructions which, when executed by the processor, cause the processor to perform operations comprising:
      automatically regenerating a transport script from a previous version, wherein the transport script includes network requests to simulate network interactions with a server hosting an application, the regeneration comprising:
         recording as a new version of the transport script network requests while executing a user interface script, wherein the user interface script includes actions to simulate user interaction with a user interface of the application;
         identifying a difference between the new version of the transport script and the previous version of the transport script, wherein the difference comprises a script modification applied to the previous version of the transport script; and
         modifying the new version of the transport script to obtain an updated transport script by applying the script modification present in the previous version of the transport script to the new version of the transport script, the applying of the script modification responsive to a determination that the script modification applied to the previous version of the transport script is not included in the recorded network requests; and
      testing the server by executing the updated transport script.
2. The apparatus as described in claim 1, wherein the instructions further cause the machine to at least:
   determine if a first timestamp associated with a server is more recent than a second timestamp associated with a first transport script, the first timestamp representing a time when the server was last updated, the second timestamp representing a time when the transport script was generated; and
   automatically regenerate the transport script responsive to a determination that the first timestamp is more recent than the second timestamp.
3. The apparatus as described in claim 1, wherein the difference between the new version of the transport script and the previous version of the transport script comprises a code comment added to the transport script.
4. The apparatus as described in claim 1, wherein the network requests are hypertext transfer protocol requests sent to the server from an application stored on the memory.
5. The apparatus of claim 1, wherein the script modification applied to the previous version of the transport script comprises an altered validation parameter, an added instruction, or a code comment.
6. The apparatus of claim 1, wherein the instructions further cause the machine to at least generate the previous version of the transport script based on execution of a user interface (UI) script.
7. The apparatus of claim 6, wherein the instructions further cause the machine to at least integrate UI information in the UI script into the previous version of the transport script.
8. A method comprising:
   determining, with a processor, whether a server has been updated more recently than a transport script used to test the server, wherein the transport script includes network requests to simulate network interactions with the server;

regenerating, without user intervention, the transport script from a previous version if the server has been updated more recently than the transport script, the regeneration comprising:

recording, as a new version of the transport script, network requests while executing a user interface script, wherein the user interface script includes actions to simulate user interaction with a user interface of an application;

identifying a difference between the previous version of the transport script and the new version of the transport script, wherein the difference comprises a script modification applied to the previous version of the transport script; and     modifying the new version of the transport script to obtain a regenerated transport script by applying the script modification present in the previous version of the transport script to the new version of the transport script, the applying of the script modification responsive to a determination that the script modification applied to the previous version of the transport script is not included in the recorded network requests; and testing the server by executing the regenerated transport script.

9. The method as described in claim 8, wherein determining whether the server has been updated more recently than the transport script further comprises:

polling the server for a first timestamp associated with a last updated time of the server;

inspecting the transport script to identify a second timestamp, the second timestamp representing a last modified date of the transport script; and     regenerating the transport script when the first timestamp is more recent than the second timestamp.

10. The method as described in claim 8, wherein determining whether the server has been updated more recently than the transport script further comprises:

polling the server for a first version identifier associated with the server;

inspecting the transport script to identify a second version identifier; and     regenerating the transport script when the first version identifier is greater than the second version identifier.

11. The method as described in claim 10, wherein regenerating the transport script further comprises setting the second version identifier equal to the first version identifier.

12. The method of claim 8, wherein the script modification applied to the previous version of the transport script comprises an altered validation parameter, an added instruction, or a code comment.

13. A tangible machine-readable storage medium comprising instructions which, when executed, cause a machine to at least:

begin execution of a current version of transport script based on a received instruction to perform load testing against a server wherein the transport script includes network requests to simulate network interactions with the server;

monitor execution of the transport script for a first failure;

regenerate the transport script upon detecting the first failure, the regeneration comprising:

recording, as a new version of the transport script, network requests while executing a user interface script, wherein the user interface script includes actions to simulate user interaction with a user interface;

identifying a difference between the current version of the transport script and the new version of the transport script; wherein the difference comprises a code comment added to the current version of the transport script; and     modifying the new version of the transport script to obtain a regenerated transport script by adding the code comment to the new version of the transport script, wherein adding the code comment to the new version of the transport script is responsive to a determination that the code comment added to the current version of the transport script is not included in the recorded network requests; and execute the regenerated transport script to perform load testing against the server.

14. The machine-readable storage medium of claim 13, further comprising instructions which, when executed, cause the machine to at least halt execution of the current version of the transport script upon detection of the first failure.

15. The machine-readable storage medium of claim 13, further comprising instructions which, when executed, cause the machine to at least monitor execution of the new version of the transport script for a second failure, the second failure attributed to a modification made to the server.

16. The machine-readable storage medium of claim 15, wherein the second failure is further attributed to an error of the user interface script.

17. The machine-readable storage medium of claim 16, further comprising instructions which, when executed, cause the machine to at least inform a user of the error of the user interface script.

18. The machine-readable storage medium of claim 13, further comprising instructions which, when executed, cause the machine further to regenerate the transport script while the server is being compiled.

19. The machine-readable storage medium of claim 13, further comprising instructions which, when executed, cause the machine further to regenerate the transport script periodically.

20. The machine-readable storage medium of claim 13, further comprising further comprising instructions which, when executed, cause the machine further to regenerate the transport script in response to a user instruction.

* * * * *